493-405 SR
FIP8608 OR RE 661
[redacted]
J. North.
Paper Folding Mach.
№ 661. Reissued Feb. 8. 1859.
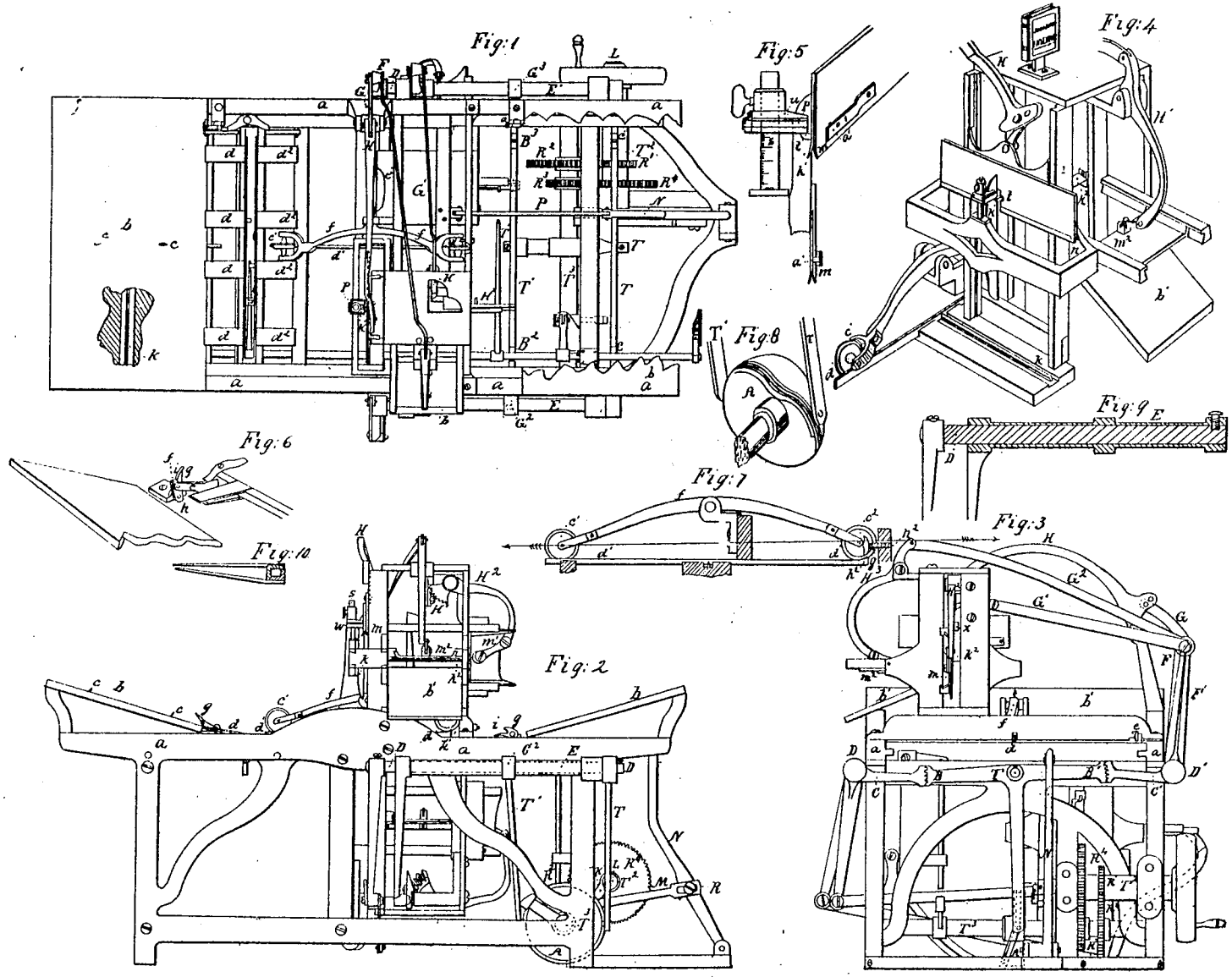

UNITED STATES PATENT OFFICE.

STUBEN T. BACON, OF BOSTON, MASSACHUSETTS, ASSIGNEE BY MESNE ASSIGNMENTS, OF JOHN NORTH, OF MIDDLETOWN, CONNECTICUT.

MACHINE FOR FOLDING PAPER.

Specification forming part of Letters Patent No. 14,697, dated April 15, 1856; Reissue No. 574, dated July 27, 1858; Reissue No. 661, dated February 8, 1859.

*To all whom it may concern:*

Be it known that JOHN NORTH, of Middletown, Connecticut, did obtain Letters Patent of the United States for certain Improvements in Machines for Folding Paper, dated the 15th day of April, 1856, and that thereafter—to wit, on the 28th day of May, 1856—assigned the same to ANSON HARDY, of Boston, in the Commonwealth of Massachusetts, who did thereafter—to wit, on the 1st day of July, 1856—assign the same to STEUBEN T. BACON, of the said Boston, who subsequently surrendered the same to the Commissioner of Patents and received new Letters Patent therefor, bearing date the 27th day of July, 1858, which Letters Patent I, the said STEUBEN T. BACON, believe to be inoperative by reason of an insufficient and defective specification. I have therefore surrendered the same and requested that new Letters Patent may be issued to me for the same invention for the residue of the period for which the original patent was granted, on the following amended specification.

To enable those skilled in the art to make and use the said invention, I will now proceed to describe its construction and operation, reference being had to the accompanying drawings and letters of reference marked thereon, forming a part of this specification, in which—

Figure 1 is a plan of the machine. Fig. 2 is a side elevation. Fig. 3 is an end view. Fig. 4 is a detached view showing in perspective the nipper and folding-knife and parts connected therewith. Fig. 5 is an enlarged view showing the mode of checking and adjusting the motion of the folding-nipper *m*. Fig. 6 is a detached view of the trip-dog and part of a finger-bar. Fig. 7 is a detached view of the cutting apparatus. Fig. 8 is a detached view of the cam which gives motion to the nippers. Fig. 9 is a section of one pair of the concentric rock-shafts, and Fig. 10 is a section of the fingers and finger-bar.

The invention consists of certain improvements in machines for folding paper, whereby the paper is folded accurately and with great neatness, economy, and rapidity.

The frame-work of the machine, as seen at *a a*, in Figs. 1 and 2, is somewhat similar in appearance to the frame-work of a double printing-press, and since the machine is double in its operation it will be necessary only to describe one half, similar letters referring to similar parts in the two halves.

*b* is the feed-table upon which the sheets are laid in order to be introduced to the folding apparatus. This board has register-pins *c c*, for the purpose of correctly presenting the sheets to the folding apparatus. The sheet is seized on its edge by the fingers *d d*, attached to the reciprocating carriage, and withdrawn from the feed-table and carried under the folding nippers. The fingers *d d* are made to open and close at the proper times by mechanism commonly employed in printing-presses to effect the same operation, which need not be described.

The fingers are raised and dropped at the time of seizing the sheet by a peculiar device, described as follows: Attached to the finger-bar, Fig. 6, near its end, is a projecting piece, *e*, having near its end, a wrist-pin or bolt, *f*. On the frame, near the edge of the feed-table, is a trip-dog, *g*, turning upon a pivot, *h*. This dog is provided with a slot, *i*, into which the wrist pin enters as the carriage advances, and from the rotation of the dog on its pivot it will be seen that the fingers must rise up until the dog is vertical, and then descend as the dog moves on, so that when the finger-bar moves away from the feed-table the wrist-pin carries the dog back to its place for the reception of the pin on its return. Attached to and near the end of the carriage is the stationary edge or knife *k*, over which the fold is made, as seen in Fig. 1, under the feed-board, part of which is represented as broken out to show the position of the knife when the carriage is out. The knife is fixed to the frame, the edge projecting slightly beyond its level. The folding-nipper *m*, Figs. 2, 4, and 5, has a pair of grasping edges or jaws, which are opened by being pressed over the folding edge or knife, and keeping them closed by the spring of the metal of which they are made. When by the movement of the carriage the knife is brought immediately under the folding-nipper *m*, the carriage stops, and the middle margin of the sheet is over the edge of the knife. By mechanism, shortly to be described, the nipper is brought down upon the stationary knife, the jaws thereof pressing the paper over the edge of the knife, and making the fold. When the nipper moves away from the knife, the spring of the metal of which the jaws are made causes them to grasp and carry the folded sheet with it into a position to be folded a second time by the knife $k'$ and nipper $m'$. In order to keep the nipper $m$ from rising beyond the required position, and to determine or gage this position, I use a check-piece, $p$, which is adjustable on the graduated stem $s$, and a stop-piece, $t$, on the nipper $m$. The check-pin slides toward and from the nipper, being grooved or dovetailed into the piece $u$, which is fixed to the stem $s$. The spring $w$ keeps the check-piece against the nipper $m$. The nipper $m'$ is moved by mechanism, shortly to be described, and as it comes up to the sheet which is held in place by the nippers $m$ it folds it over the knife $k'$. At the time the nipper $m'$ comes up to make the fold it opens the nipper $m$ in the following manner: A projecting piece, $x$, on this nipper strikes the pin $a$, which is attached to one jaw of nipper $m$, and passes through an opening in the other jaw, so as to open the nipper $m$ and release the sheet from its grasp. The nipper $m$ is cut out in the center of the folding edges to the extent of the width of the bite or grasp of the nipper $m'$. While in the act of folding, the nipper $m'$ pushes the check-piece $n$ from above the stop $t$, and allows the nipper $m$ to be carried up till the stop $t$ strikes the fixed piece $u$, and nipper $m$ is entirely clear from the sheet. The check-piece bears against the stop-piece until the nipper $m$ is carried down again to make another fold. The nipper $m'$, having completed the second fold, carries the sheet back to be subjected to a third folding by nipper $m$ and knife $k^2$. The operating, checking, and opening of the nipper $m'$ and of clearing it from the sheet are performed in a manner similar to those just described for nipper $m$, and so on for nipper $m^2$, and any number that may be requisite. When the sheet is folded, it is dropped from the last nipper upon the delivery table $b'$.

The drawings represent a machine for folding octavo volumes. According to the mode of printing, the halves of the sheet must be folded in opposite directions, and the machine is so arranged that one half is folded up and the other half down, the part for folding from below being similar in construction and operation to that already described. The sheet is laid on the feed-table, and as it is taken and carried along by the fingers upon the carriage it is cut in halves by the rolling cutter $c'$ upon the cutting plate or bed $d'$, and while one half is carried through and folded, as already described, the other half goes through a similar course, except that it passes under a knife attached to the fixed block $e'$, and is folded by a nipper which rises up from below. In the machine represented there are two feed-tables, and there are two sets of fingers, $d$ $d^2$, upon reciprocating carriage. Upon that side of the carriage where the paper is folded up I have two knives, which knives $k$ $k$ come alternately under the nipper $m$. I have two rolling cutters, $c$ $c^2$, at the extremities of a rocking bar, $f$, which is pivoted to the frame. One end of this bar is in contact with a bifurcated spring-catch, or kind of escapement, $g$, and slips over (above and below) a projection in the center of this catch, as it is shown in Fig. 7, by the following means: The extremities of the bed on which the cut is made are provided with inclined planes, one of which is shown at $h$, Fig. 7, the other being at the opposite part of the carriage. As the cutting-rollers ascend these inclined planes they are alternately raised and depressed, and the end of the rocking bar is forced to pass over the projection of the escapement, so that it is above the projection when that end of the bar is up, and below when it is down. The spiral spring $n'$ holds the bar in either of its positions with sufficient force to keep the cutters at their work. The various motions given to all the folding-nippers are derived from a single cam, A, operating upon levers T T'. The arms of lever T are furnished with sector-gears B B,' which take into arms G, G', connected with the rock-shafts D D'. These rock-shafts are inclosed in and pass through hollow rock-shafts E E, with which they are concentric. The arms of the lever T' are also furnished with sector-gears $B^2$ $B^3$, similar to gears B B', and these take into arms $G^2$ $G^3$, connected with the hollow rock-shafts E E. The first folding-nipper, $m$, gets its motion from rock-shaft D' through the medium of the vibrating arm F, connecting-link G, and lever H, to which it is attached. The second folding-nipper, $m'$, gets its motion from the hollow rock-shaft E' through the medium of the vibrating arm F', connecting-link G', sector bevel-gear H', and lever $H^2$. The third nipper, $m^2$, gets its motion from the rock-shaft D' through the medium of arm F', connecting-link $G^2$, and lever $H^3$. The nippers below the carriage get their motion from rock-shafts E D by means similar to those just described for nippers $m$ $m'$ $m^2$. The carriage is moved back and forth by the crank K upon the main driving-shaft L through the medium of the connecting-rod M, lever N, and connecting-link P. The carriage must be stopped while the sheet is being folded upon it. This is effected by means of the slot R in the connecting-rod M, in which plays the pin connecting the rod with the lever, so that the crank moves through nearly a quarter-revolution while the slot is passing over the pin and before it acts upon the lever N. The cam A makes two revolutions to one of the crank K, and this is affected as follows: The small gear R' on the driving-shaft $T^2$ takes into the larger gear $R^2$ on the cam-shaft $T^3$, and the small gear $R^3$ on the cam-shaft takes into the larger gear $R^4$ on the hollow shaft $T^2$, inclosing the driving-shaft. The crank is connected with this hollow shaft, and by the suitable proportionment of the gearing the requisite rela-

United States Patent Office

PTO - BOYERS, PA Duty Station

MISSING PAGE TEMPORARY NOTICE

PATENT # RE661 FOR ISSUE DATE 2-8-1859

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE p. 3 of text + rest

N/A. Bayes
at Bayes
11-3-92

Data Conversion Operation

Boyers, Pa

No. 661.—*Machine for Folding Paper.*—I claim as the invention of North the use of a stationary folding knife in a machine for folding printed sheets of paper, substantially as herein described, and as the invention of said North.

I also claim the combination of the folding knives *k k*, with the reciprocating carriage, as set forth, and as the invention of the said North.

I also claim giving to the reciprocating carriage its proper motion by means of the crank K, and slotted connection rod M, in combination with lever N and link P, substantially as described, and as the invention of the said North.

I also claim the device for raising and depressing the fingers, as fully shown Fig. 6, and as the invention of the said North.

I also claim the combination of the folding and carrying nippers with the stationary folding knife, substantially as described, and as the invention of the said North.

I also claim releasing the sheet from the nippers by means substantially as described, and as the invention of the said North.

I also claim the circular knives $c^1$ $c^1$, for separating the sheets, when operated substantially in the manner described, and as the invention of the said North.

I also claim the combination of the levers T and $T^1$, with double concentric rock shafts D and E, substantially in the manner and for the purposes set forth, and as the invention of the said North.

I also claim the adjustable check, and the mode of releasing its hold by the absence of the nippers, as set forth.

STEUBEN T. BACON,
*Assignee of John North.*